Nov. 12, 1957 H. LESCURE 2,812,877
CLOSURE FASTENER
Filed March 18, 1955
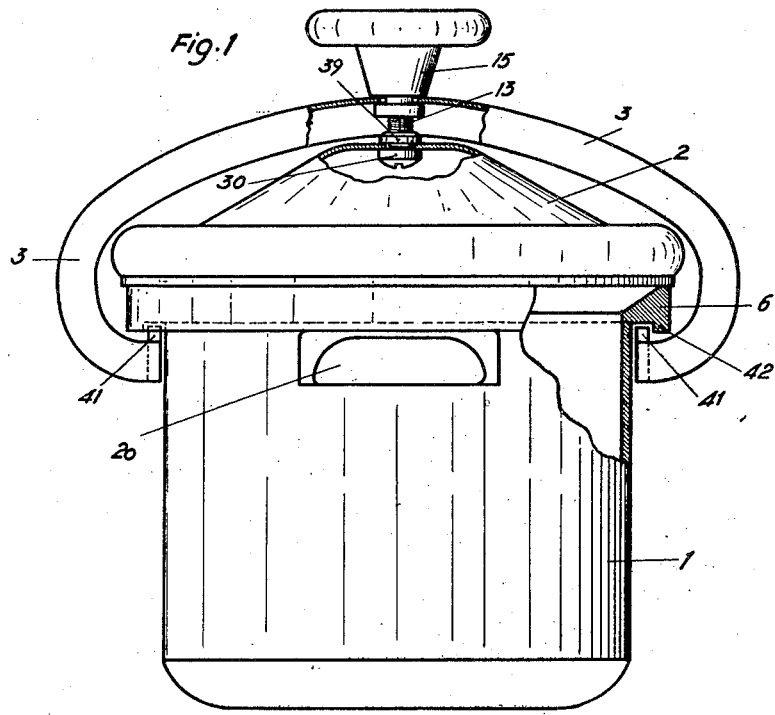
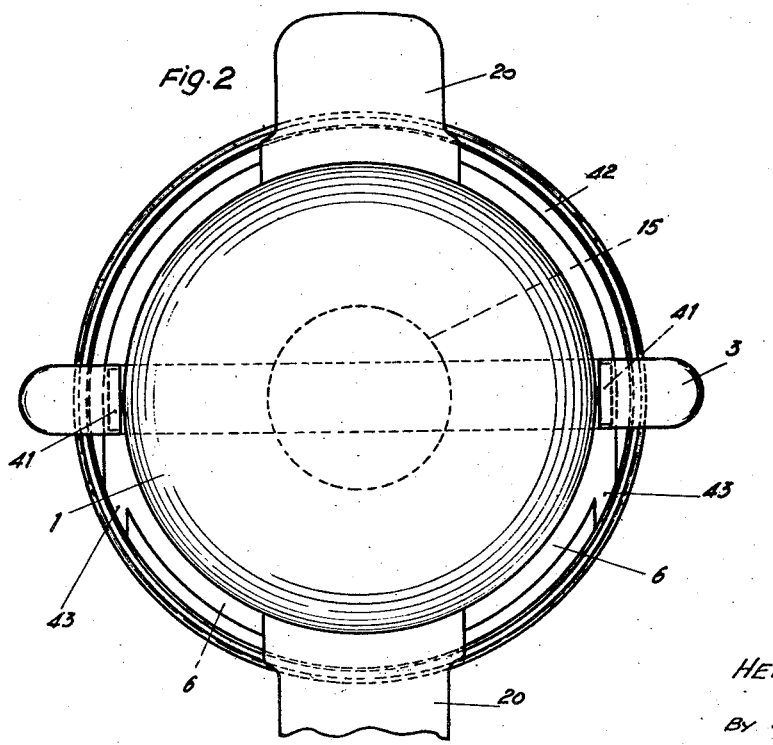
INVENTOR
HENRI LESCURE
BY Irvin S. Thompson
ATTY.

United States Patent Office 2,812,877
Patented Nov. 12, 1957

2,812,877

CLOSURE FASTENER

Henri Lescure, Selongey, France

Application March 18, 1955, Serial No. 495,257

Claims priority, application France April 22, 1954

3 Claims. (Cl. 220—57)

The present invention relates to pressure cookers for foodstuffs and more particularly to cookers of the type in which the lid, provided with an elastic gasket, is provided with a yoke which is secured at its ends on the body of the cooker, and the clamping of the lid on the body is obtained by an adjustable member interposed between the lid and the yoke.

For eliminating all risks of a projection of the lid, it is advisable that the ends of the yoke be in contact with the rim of the body at points as far distant as possible from the periphery of said rim. To this effect, there are provided at the ends of the yoke, projections, directed upward and taking a position, when the cooker is closed, on the inner side with respect to projections directed downwards and provided on the lower face of the rim of the body.

The appended drawings show, by way of example, one form of embodiment of a pressure cooker built in accordance with the invention.

Figure 1 is an elevational view partly in section.

Figure 2 is a bottom view.

In Figures 1 and 2, the reference numeral 1 indicates the body of the cooker, provided with handles 20 while 2 designates the lid on which is secured a threaded rod 13 engaged in a control knob 15 threaded inside. This knob is engaged with the upper portion of the yoke 3 having a U-shaped section, the ends of which, in the closing motion, bear on the lower face of the rim 6 of the body of the cooker, while the lid 2 is lowered on the same rim.

The lid 2 is clamped between the head 30 of the threaded rod 13 and a washer 39 screwed on said rod.

The invention also comprises a device the purpose of which is to prevent the branches of the yoke, due to deformations caused by the user or to any other cause, from moving beyond the periphery of the rim 6 of the body and causing the projection of the lid.

In order to make such an occurence impossible, each branch of the yoke 3 carries a projection 41 directed upwards. This projection is so arranged as to be able to take up a position under the rim 6 of the body of the cooker.

In the example represented, the projection 41 is secured by welding or otherwise inside the flanges of the yoke 3 as may be seen in Figure 3.

On the other hand, there are arranged on the lower face of the rim 6, ribs 42 extending about the periphery of said rim and separated by intervals 43. The positions of the ribs 42 on the rim 6 and those of the projections 41 on the yoke 3 are so selected that, the cooker being closed, the projections 41 are inside the ribs 42.

Before putting the lid 2 in position for closing the cooker, an action is exerted first on this lid and on the yoke 3, independently of the body 1. By means of the control knob 15 the top of the yoke and the top of the lid are moved as close as possible to each other so as to obtain the maximum spacing between the edge of the lid and the projections 41 of the yoke 3. Then the lid is engaged on the body in such a manner that the projections 41 of the yoke go through the intervals 43 provided between the ribs 42 of the rim 6. When the lid has been centered exactly with respect to the body the knob 15 is rotated so as to move the center of the lid and the middle of the yoke away from each other which has the effect of causing the projections 41 to bear on the rim 6 while the periphery of the lid is applied on the body 1. There is thus obtained a sealing closure.

If, under the action of too high a pressure the ends of the yoke 3 moved apart from each other in an excessive manner, the projections 41 would come in contact with the rib 42 and a larger opening of the branches of the yoke would be prevented.

If, previously, the yoke, for any cause whatsoever, had undergone a deformation having as an effect to increase substantially the spacing between the ends of the branches, the projections 41 could not pass through the intervals 43 provided between the ribs 42, so that the placing of the lid in position on the body could not take place and the cooker could not be used.

The arrangement of the projections 41 and 42 thus gives the user an absolute safety as regards the risks of projection of the lid.

I claim:

1. A pressure cooker comprising a body, a lid for the body, and a yoke to hold the lid to the body, said body having a rim extending around the upper part of said body and outwardly thereof, a downwardly extending rib on the outer side of said rim whereby to provide a channel between said rim and the outside of said body, said rib being discontinuous at two substantially oppositely disposed areas to provide two opposed parallel entrances tangential to said channel and opening in the same direction, said yoke having a pair of diametrically opposed arms extending from a mid-point of said lid outwardly past said rim, each of said arms having a downwardly and reversely curved end and each of said ends having an upwardly disposed projection, said projections being spaced apart the same distance as said entrances and as opposite parts of said channel, whereby said lid may be placed on said body and the projections of said yoke passed through said entrances and into said channel to lock said lid on said body.

2. The apparatus of claim 1, said lid and said yoke being joined by a screw threaded member, said member being fixed to said lid and passing through said yoke, and a nut threaded on said member on the opposite side of said yoke from said lid, whereby said yoke and lid may be held in assembled but variable relation.

3. A pressure cooker comprising a body, a lid for the body and a yoke, said body having an outwardly and downwardly extending projection therearound to form a downwardly facing channel between said body and said projection, said projection having a pair of entrances therethrough, said entrances being substantially tangential to said channel and opening in the same direction, and said yoke having two outwardly and downwardly extending arms, each of said arms having an upwardly directed extension on the ends thereof, said arm projections being spaced apart the same distance as said entrances, whereby said arm projections may be passed through said entrances to lodge in said channel.

References Cited in the file of this patent

UNITED STATES PATENTS

| | | |
|---|---|---|
| 1,106,837 | Pfaehler et al. | Aug. 11, 1914 |

FOREIGN PATENTS

| | | |
|---|---|---|
| 439,176 | France | Apr. 1, 1912 |
| 577,890 | France | June 16, 1924 |
| 474,095 | Germany | Mar. 26, 1929 |
| 589,099 | Germany | Dec. 5, 1933 |